Aug. 27, 1968    R. C. BARKER    3,398,732
PORTABLE STOVE STRUCTURE
Filed Feb. 13, 1967    2 Sheets-Sheet 1

INVENTOR.
RAY C. BARKER
BY John H. Widdowson
Phillip A. Rein
ATTORNEYS

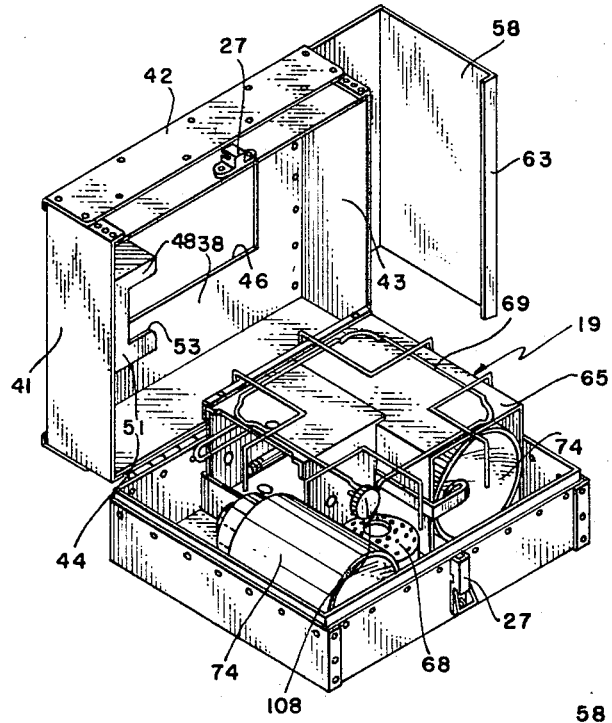
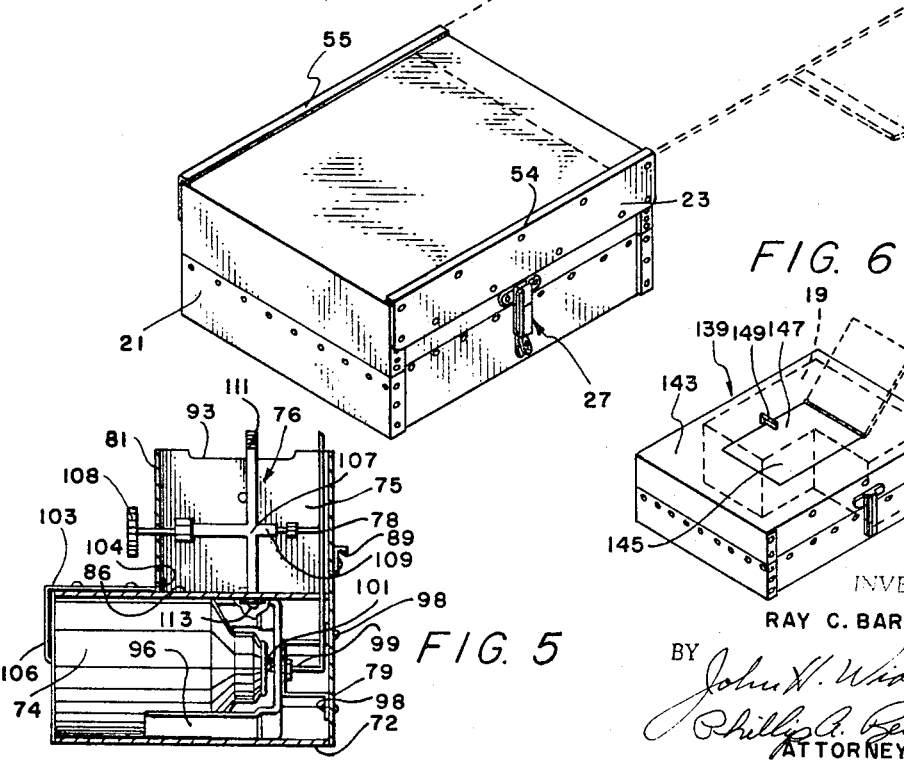

United States Patent Office 3,398,732
Patented Aug. 27, 1968

3,398,732
PORTABLE STOVE STRUCTURE
Ray C. Barker, 8522 W. 9th,
Wichita, Kans.
Filed Feb. 13, 1967, Ser. No. 615,589
5 Claims. (Cl. 126—9)

ABSTRACT OF THE DISCLOSURE

A portable stove comprising a rectangular case with a hinged top portion adapted to enclose a burner when the latter is reclined. Said top portion has an opening which is uncovered by a slide. In use the slide is moved to one side to form a table and the burner is erected to extend through the opening.

Numerous types of portable stoves for camping and the like are known to the prior art having means for collapsing and carrying the elements of the same from one location to the other. However, the prior art devices are bulky in size requiring a plurality of parts to be attached thereto for the usage thereof making the same readily accessible to lost or misplaced elements and requiring special tools for its assembly. Additionally, the prior art devices are limited in fuel carrying capacity, substantially inoperative during windy conditions, readily subject to corrosion, and are heavy and bulky in size and weight.

In a preferred specific embodiment of this invention, a portable cooking stove is provided having a traveling housing or casing adapted to receive and enclose a heating assembly. The traveling casing includes a support bottom assembly having a top or lid assembly pivotally connected by a hinge member thereto and adapted to cover the bottom assembly so as to form a large storage area therebetween. A handle member is connected to the hinge member to provide means for carrying the casing and on the opposite side thereof is a latch means operable to secure the top assembly to the bottom assembly in the closed condition for conveyance thereof. The top assembly is provided with an access or support opening which is selectively closed by a closure lid slidably mounted thereon. The heating assembly includes an L-shaped burner assembly, a burner guard connectible to the burner assembly, and a cooking grid mountable on the burner guard. The burner assembly includes a housing adapted to receive a fuel cartridge connected as by a conduit to a release valve which has a control knob connected thereto operable to selectively release fuel from the cartridge to regulate the size of the flame produced as conventionally done in other heating structures. An upper or burner portion of the housing is mountable through the support opening in the top assembly with the burner guard mountable on an upright portion of the relief valve and a gas burner is connectible to the upright portion to anchor the guard thereto. Next, the cooking grid is mountable about the burner guard providing an upper, horizontally extended, surface to support a coffee pot, skillet, or the like. Concurrently, the closure lid is movable laterally of the top assembly to provide a utility stand for supporting cooking utensils, pans or the like. On disassembly of the heating assembly, all of the aforementioned elements thereof are placed within the cavity of the traveling casing in addition to an extra fuel cartridge and the latch means anchors the top assembly to the bottom assembly with the closure lid covering the support opening thereby presenting a light weight, durable, and compact portable cooking stove structure.

An object of this invention is to provide a portable stove structure overcoming the above-mentioned disadvantages of the prior art devices.

Another object of this invention is to provide a compact, portable camping stove structure having a traveling case which, when opened, exposes all of the working elements, but when closed, acts as a transporting means for the entire structure.

Still, another object of this invention is to provide a portable camping stove structure having a traveling casing and an L-shaped burner assembly adapted to be mounted in an opening in a top lid assembly of the casing so as to provide the same with substantial horizontal and vertical stability in addition to placing the heating portion of the burner assembly in an elevated position.

One other object of this invention is to provide a combination cooking and heating stove structure adapted to rigidly support an elevated burner or flame guard and cooking grid whereby a flame produced thereby is protected from the elements but elevated so as to be readily usable.

Still, a further object of this invention is to provide a compact, portable cooking stove structure adapted to receive a plurality of heating assembly elements and a plurality of fuel cartridges within a traveling casing so that the same can be used for extended periods without need of additional fuel and is easily conveyed.

One other object of this invention is to provide a portable stove structure which is simple in construction, provides a minimum number of parts, economical to manufacture, and readily assembled and disassembled by anyone without the requirement of special tools.

Various other objects, features and advantages of the invention will become apparent to those skilled in the art from the following discussion, taken in conjunction with the accompanying drawings, in which:

FIG. 3 is a perspective view of the portable stove structure of this invention having a top lid assembly in an open position and illustrating a heating assembly in a compact, storage condition;

FIG. 4 is a perspective view of the portable stove structure of this invention in the closed and locked condition with a movable closure lid thereof illustrated in the extended position in dotted lines;

FIG. 5 is a sectional view illustrating the construction of a burner assembly of the portable stove structure of this invention; and FIG. 6 is a perspective view illustrating another embodiment of the portable stove structure of this invention.

Figure 1:
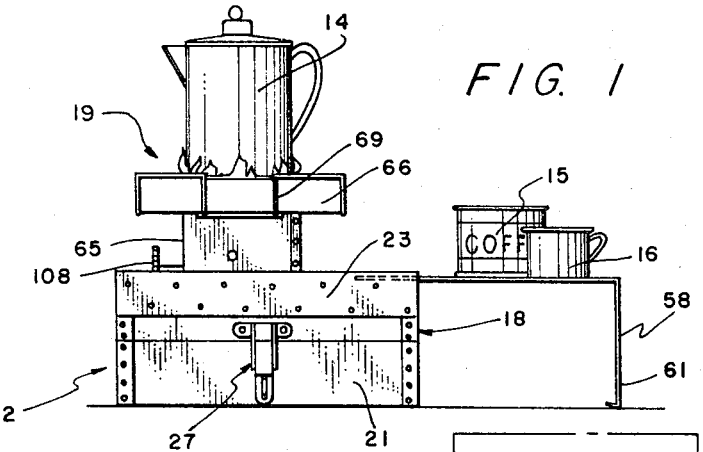
FIG. 1 is an elevational view of the portable stove structure of this invention illustrating one use thereof as a cooking means.

The following is a discussion and description of preferred specific embodiments of the portable stove structure of this invention, such being made with reference to the drawings, whereupon the same reference numerals are used to indicate the same or similar parts and/or structure. It is to be understood that such discussion and description is not to unduly limit the scope of the invention.

Referring to the drawings in detail in particular to FIG. 1, the portable stove structure of this invention, indicated generally at 12, is illustrated as supporting and heating a coffee pot 14 and having a laterally extended shelf or stand portion to support a coffee can 15 and a cup 16 or the like thereon. The stove structure 12 includes a traveling housing or casing means 18 adapted to receive and support a heating means 19 enclosed therein for ease of conveyance and storage.

Figure 2:
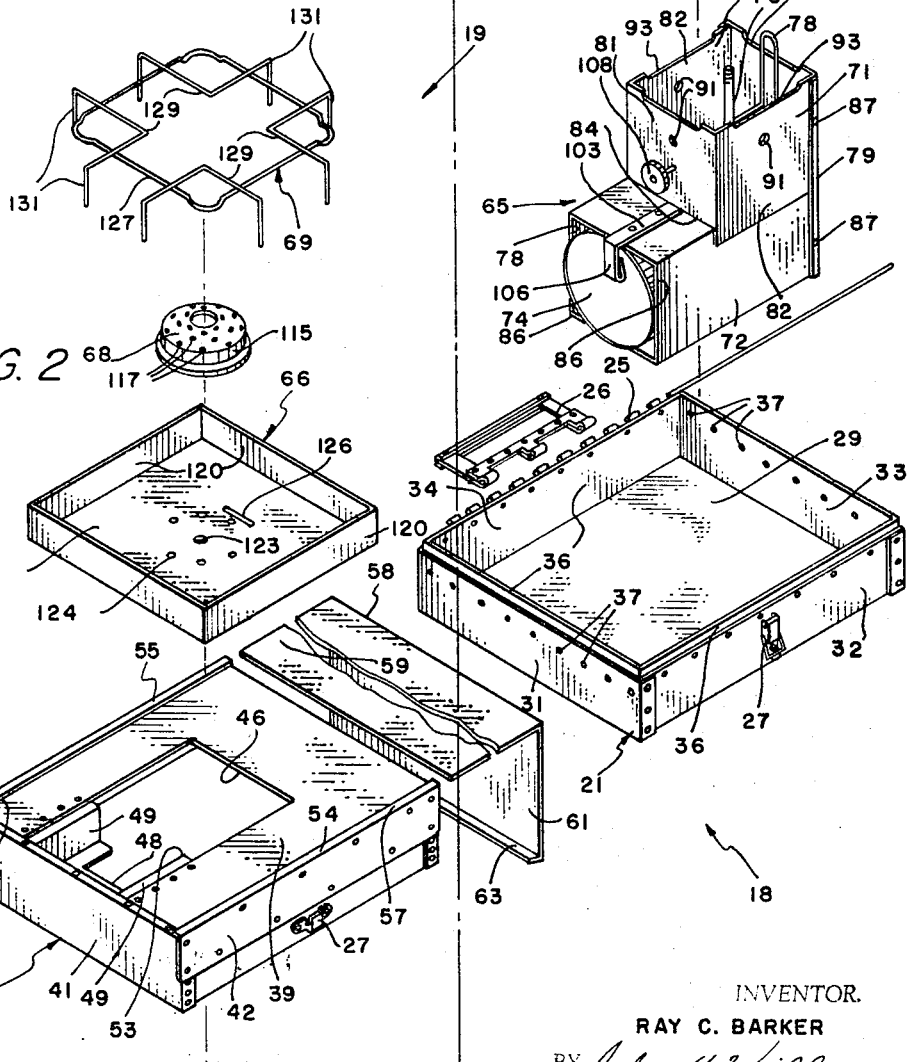
FIG. 2 is an enlarged exploded perspective view of the portable stove structure of this invention.

As shown in FIG. 2, the casing means 18 includes a support or bottom assembly 21; a top or lid assembly 23 pivotally connected to the bottom assembly 21 as by a hinge member 25; a handle member 26 connected to the hinge member 25 for ease in conveyance; and a latch means 27 to secure the top assembly 23 in a closed, locked position against the bottom assembly 21. More particularly, the bottom assembly 21 is of a rectangular box shape having a bottom wall 29 integral with upright sidewalls 31, 32, 33, and 34. Inner, upright walls 36 are secured to the sidewalls 31, 32, 33, and 34 as by rivets 37 to provide a guide means for lateral stabilization of the top assembly 23 in the closed position as will become apparent. It is obvious that the bottom assembly 21 can be manufactured as by a simple stamping process making a deep draw to form the bottom wall 29 and integral upright sidewalls 31–34, inclusive.

The top assembly 23 is substantially identical in size and general shape to the bottom assembly 21 having a top wall 39 with downwardly depending sidewalls 41, 42, 43, and 44 (FIG. 3). The top wall 39 is provided with an elongated rectangular support or access opening 46 positioned adjacent the sidewall 41 extended parallel and substantially mid-way of the sidewalls 42 and 44. A bracket member 48 is provided having a pair of Z-shaped support legs 49 which are secured as by riveting, welding or the like to opposed edges of the support opening 46. The bracket member 48 is provided with a lower wall 51 with a cut out section 53 for reasons to become obvious. Secured to the sidewalls 42 and 44 so as to overlap the top wall 39 and extended the length thereof are a pair of L-shaped guide members 54 and 55. An upper leg 57 of the respective guide members 54 and 55 are spaced upwardly and overlay the top wall 39 to provide a channel means adapted to slidably receive a closure lid or stand member 58.

More specifically, the closure lid 58 is constructed of a sheet metal material having a main body 59 of a width adapted to move axially between the guide members 54 and 55 relative to the top wall 39 from opened to closed positions. The lid 58 is provided with an L-shaped support member 61 integral with and downwardly depending from the main body 59. The support member 61 has a laterally bent lower leg portion 63 inclined upwardly towards the main body 59 for reasons to become obvious.

As shown in FIG. 2, the heating means 19 includes a burner assembly 65; a burner guard 66 mountable on the burner assembly 65 and connected thereto as by a gas burner element 68; and a cooking grid 69 mountable on the burner guard 66 adapted to support the coffee pot 14 or the like thereon. The burner assembly 65 includes an L-shaped housing 71 having one support leg portion 72 adapted to receive a fuel cartridge 74 therein, an upright leg portion 75 having a control valve 76 therein, and a conduit 78 operably connecting the fuel cartridge 74 to the control valve 76.

More specifically as shown in FIGS. 2 and 5, the housing 71 is preferably constructed of an aluminum sheet material which can be drawn or stamped into the required shape and secured in this condition as by rivets or the like. The support leg portion 72 is of a square box shape in transverse cross section having one open end 78 adapted to receive the fuel cartridge 74 and the other end is closed by upright plate member 79 secured thereto. The upright leg portion 75 is of a U-shape in transverse cross section having a base wall 81 and parallel leg sections 82. The base wall 81 has a cut out section 84 adapted to receive the support leg portion 72 with the leg sections 82 against opposed sidewalls 86 of the support leg portion 72 and the open end thereof closed by the plate member 79. The plate member 79 is secured as by screws 87 to the adjacent portions of the upright leg portion 75 and the support leg portion 72 providing stability thereto. An L-shaped ledge member 89 is secured to the outer surface of the plate member 79 for reasons to become obvious. The base wall 81 and leg sections 82 are provided with openings 91 in addition to cut out sections 93 in the upper edges thereof plus a similar cut out section 94 in the upper edge of the plate member 79 to admit combustion air to the gas burner element 68 as will be explained.

The fuel cartridge 74 is of a conventionally available pressurized structure such as a type sold by the Coleman Company Inc. of Wichita, Kans. and known as "L.P. Gas Fuel" sold under the Coleman label. The fuel cartridge 74 is a portable, pressurized container containing liquefied petroleum gas in a self-pressurized container licensed under U.S. Patents 2,683,484 and 2,744,809.

As shown in FIG. 5, the cartridge 74 is mountable through the open end 78 in the support leg portion 72 and engageable with a bracket 96 secured to the plate member 79 as by screw members 98. The bracket 96 is of the shape adapted to engage the outer edges of the cartridge 74 to resiliently grasp the same. The bracket 74 is provided with a central needle valve 99 adapted to engage a release valve 101 on the cartridge 74 to release fuel therefrom into the conduit 78 for conveyance to the control valve 76. In order to assure continuing engagement of cartridge 74 and the needle valve 99 to prevent unintentional fuel leakage, a clamp member 103 is mounted on a top sidewall 86 of the support leg portion 72 having an upright portion 104 engageable with the inner surface of the base wall 81 to restrict rearward movement thereof and a downwardly depending spring portion 106 engageable with the rearward end of the fuel cartridge 74. It is seen that the bracket 96 prevents forward movement of the fuel cartridge 74 and rearward movement thereof is prevented by the engagement of the spring portion 106 therewith.

The control valve 76 includes a valve portion 107 having a flow regulator knob 108, an inlet section 109 secured to the conduit 78, and an upright discharge portion 111. The valve portion 107 is secured as by a bolt 113 to the top sidewall 86 of the support leg portion 72 and positioned centrally of the upright leg portion 75. The regulator knob 108 extends through an opening in the base wall 81 of the upright leg portion 75 so as to be readily rotatable to regulate fuel flow therethrough. The valve portion 107 is of a conventionally available needle and seat type operable on rotation of the regulator knob 108 to control the amount of fuel flow through the discharge portion 111 into the gas burner element 68.

The upper end of the discharge portion 111 is threaded so as to releasably receive the burner element 68 thereon. The burner element 68 is of a conventionally available type having a dome shaped head portion 115 with a plurality of radially extended openings 117 therein operable to disperse the fuel received from the control valve 76 to achieve a uniform and wide burning flame in operation.

The burner guard 66 is of a shallow box shape having a base section 118 with integral upright sidewalls 120. The base section 118 is provided with a central opening 123 adapted to receive the upper end of the discharge portion 111 and a plurality of radially positioned air inlet openings 124. A slot opening 126 is provided to receive an upright bent portion of the conduit 78 therethrough to place the same adjacent the burner element 68 for reasons to be explained.

The cooking grid 69 is of a bent wire construction having a substantially square main body 127 with support members 129 secured to each respective corner thereof. Each support member 129 is provided with downwardly depending leg members 131 adapted to contact the adjacent outer surfaces of the respective upright sidewalls 120 of the burner guard 66 when assembled to prevent lateral movement of the cooking grid 69 therefrom.

In the use and operation of the portable stove structure 12 of this invention, reference is made to FIG. 4 wherein the casing means 18 is shown in the closed or storage condition. It is seen that the closure lid 58 encloses the access opening 46 and the latch means 27, plus the engagement of the leg portion 61 with the undersurface of the bottom assembly 21, keeps the stove structure 12 in the locked condition. It is seen that the latch means 27 is of a conventionally available wire hook type having means thereon for securing the same in the latched condition as by a padlock or the like. On moving the closure lid 58 laterally and unlocking the latch means 27, the top assembly 23 is movable to the open position of FIG. 3 thereby revealing the compact storage position of the heating means 19.

More specifically, as shown in FIG. 3, the burner guard 66 is placed against the bottom wall 29 and the housing 71 of the burner assembly 65 is of a size and shape that fits snugly therein between the upright sidewalls 120. The burner element 68 also fits within the burner guard 66 and the cooking grid 69 fits about the housing 71. The casing means 18 is of a size to receive an additional fuel cartridge 74 between the burner guard 66 and the sidewall 31 thereby providing means for readily carrying an additional fuel supply which is extremely desirable on camping trips and the like.

On assembly of the portable stove structure 12 into a functional heating device, the burner assembly 65 is placed in an upright position within the bottom assembly 21 so that the open end 78 of the support leg portion 72 is placed adjacent the sidewall 31 and the upright leg portion 75 is somewhat aligned with the support opening 46 in the top lid assembly 23. The top assembly 23 is thereupon closed and locked to the bottom assembly 21 as by the latch means 27 and the snug fit of the access opening 46 with the upright leg portion 75 provides a laterally stable upright heating device and the bottom wall 29 of the bottom assembly 21 provides a vertical support area. The upper surface of the ledge member 89 engages the adjacent inner surface of the top wall 39 of the top assembly 23 to prevent vertical movement of the heating means 19. Next, the burner guard 66 is mounted upon the upright leg portion 75 with the opening 123 mounted about the upright portion 111 of the control valve 76 and the conduit 78 is extended through the slot 126. The gas burner element 68 is thereupon threaded upon the upright portion 111 which concurrently acts to securely hold the burner guard 66 against the upright leg portion 75. Then, the cooking grid 69 is readily mounted upon the burner guard 66 with the downwardly depending leg portions 131 engagable with opposed surfaces of the sidewalls 120 to securely hold the same in a given position lateral movement. It is seen that the closure lid 58 is movable laterally of the top wall 39 of the top assembly 23 whereupon the downwardly depending leg portion 61 provides vertical support therefor so as to support the coffee can 15 and the cup 16 thereon as shown in FIG. 1.

On use of the stove structure 12 as a heating device, the regulator knob 108 is readily rotatable to permit the discharge of a controlled amount of gaseous fuel from the fuel cartridge 74 through the control valve 76 for discharge to the gas burner element 68. This discharged fuel is ignited as by a lighter or a match, and the amount of flame produced thereby is controlled by rotation of the knob 108 in a conventional manner. The positioning of the conduit 78 adjacent the flame emitting from the gas burner element 68 operates to heat the gas as it is moved through the conduit 78 for a more efficient and effective operation thereof. It is seen that the access opening 46 is of such a size and shape so as to permit one to readily turn the knob 108 for achieving the proper amount of flame produced through the gas burner element 68.

It is seen that the portable stove structure 12 of this invention provides a compact, portable structure that is readily mountable within the casing means 18 for easy conveyance and storage as desired. The mounting of the burner assembly 65 through the top assembly 23 provides a unique and novel structure whereupon the entire carrying case acts as a supporting structure and provides means for elevating the actual burning flame above the supporting surface so that the same can receive a sufficient amount of combustible air to the flame. Additionally, the novel burner guard structure of this invention provides a means for shielding the flame being produced to keep the same from being blown out by air currents. It is seen that the stove structure of this invention provides a compact, readily carriable structure having a plurality of uses such as a cooking and/or heating means and such can be made out of aluminum material or the like so as to be lightweight and noncorrosive.

As shown in FIG. 6, a second embodiment of this invention involves a stove structure 139 having the previously described heating means 19 and bottom assembly 21 with a top assembly 143 connected thereto. The top assembly 143 is substantially identical to the previously described top assembly 23 having a square opening 145 adapted to receive the heating means 65 therethrough. A lid member 147 is pivotally connected to one edge of the opening 145 and secured in the closed position as by a turn lock member 149. It is obvious that the stove structure 139 operates in a manner similar to the first embodiment thereof and further discussion thereof is not deemed necessary.

As will be apparent from the foregoing description of the applicant's portable stove structures, relatively simple and inexpensive means have been provided which are readily portable and easily assembled without special tools for usage with a minimum amount of effort required. The applicant's construction provides the utmost in a lightweight structure having means for carrying a plurality of fuel cartridges so that the same can be used for prolonged periods.

While the invention has been described in connection with preferred specific embodiments thereof, it will be understood that this description is intended to illustrate and not to limit the scope of the invention, which is defined by the following claims.

I claim:
1. A portable stove structure, comprising:
   (a) a casing means having a bottom assembly, a top assembly connected to said bottom assembly movable from closed to opened positions; and said top assembly and said bottom assembly operable to form a cavity therebetween when in the closed position;
   (b) said top assembly having a support opening therein; and
   (c) a heating assembly mounted within said cavity having a burner portion extended traversely of said support opening in said top assembly when same is in said closed position.
2. A portable stove structure as described in claim 1, wherein:
   (a) said casing means having a closure lid slidably mounted on said top assembly selectively movable from a first position covering said support opening to a second position laterally of said support opening to provide an auxiliary support stand.
3. A portable stove structure as described in claim 2, wherein:
   (a) said closure lid having a main body movable axially of said top assembly and a downwardly depending leg member engageable with said bottom assembly in said first position to secure the same thereto and engageable with a support surface in the plane of the lower surface of said bottom assembly in said second position thereby providing the auxiliary support stand.
4. A portable stove structure as described in claim 1, wherein:
   (a) said heating assembly having a control valve connected to said burner portion to regulate fuel flow from a fuel supply cartridge mounted therein; housing means having a clip member engageable with said fuel supply cartridge to releasably connect the same thereto; and a needle member engageable with said fuel supply cartridge to release fuel to said control valve.

5. A portable stove structure as described in claim 1, wherein:
   (a) said casing means having a hinge member pivotally connecting said top assembly to said bottom assembly and a handle member connected to said hinge member for carrying said stove structure.

References Cited

UNITED STATES PATENTS

| | | | |
|---|---|---|---|
| 1,286,274 | 12/1918 | Gates | 126—38 |
| 2,852,016 | 9/1958 | Weatherwax | 126—9 |
| 2,867,206 | 1/1959 | Mendez | 126—38 |
| 2,907,316 | 10/1959 | Windust | 126—9 |

FREDERICK KETTERER, *Primary Examiner.*